United States Patent [19]
Guillame

[11] Patent Number: 5,991,632
[45] Date of Patent: Nov. 23, 1999

[54] CORDLESS TELEPHONE AND METHOD OF SYNCHRONIZATION FOR SECURE, HIGH-SPEED, HIGH-VOLUME DATA TRANSFER

[75] Inventor: Brady Guillame, Long Beach, Calif.

[73] Assignee: Casio PhoneMate, Inc., Torrance, Calif.

[21] Appl. No.: 08/826,564

[22] Filed: Apr. 4, 1997

[51] Int. Cl.⁶ .............................. H04Q 7/30; H04Q 7/32
[52] U.S. Cl. .......................... 455/466; 455/465; 375/355; 375/357; 375/364
[58] Field of Search ................................. 455/466, 465; 375/355, 357, 364

[56] References Cited

U.S. PATENT DOCUMENTS

| | | | |
|---|---|---|---|
| 5,073,932 | 12/1991 | Yossifor et al. | 380/23 |
| 5,084,891 | 1/1992 | Ariyavisitakul et al. | 371/42 |
| 5,434,905 | 7/1995 | Maeda et al. | 379/61 |
| 5,436,937 | 7/1995 | Brown et al. | 375/376 |
| 5,442,653 | 8/1995 | Saito | 375/219 |
| 5,463,351 | 10/1995 | Marko et al. | 331/1 A |
| 5,703,934 | 12/1997 | Zicker et al. | 455/462 |
| 5,842,122 | 11/1998 | Schellinger et al. | 455/403 |
| 5,848,095 | 12/1998 | Deutsch | 375/202 |

Primary Examiner—William G. Trost
Assistant Examiner—Alan Gantt
Attorney, Agent, or Firm—Frishauf, Holtz, Goodman, Langer & Chick, P.C.

[57] ABSTRACT

A cordless telephone includes a base unit having a data generator which generates a digital data burst having a transition period, a data encoder which encodes the digital data burst, and a transmitter which transmits the encoded data burst; and a handset having a receiver responsive to and sampling the encoded data burst, and a synchronization device operatively coupled to the receiver for maintaining synchronization between the receiver and the transmitted encoded data burst in accordance with a characteristic of an expected time of transition of an incoming signal of the data encoder by comparing an actual time of transition to the expected time of transition and adjusting a sampling point of the transmitted encoded data burst by a one-sided majority vote of samples around the sampling point.

50 Claims, 6 Drawing Sheets

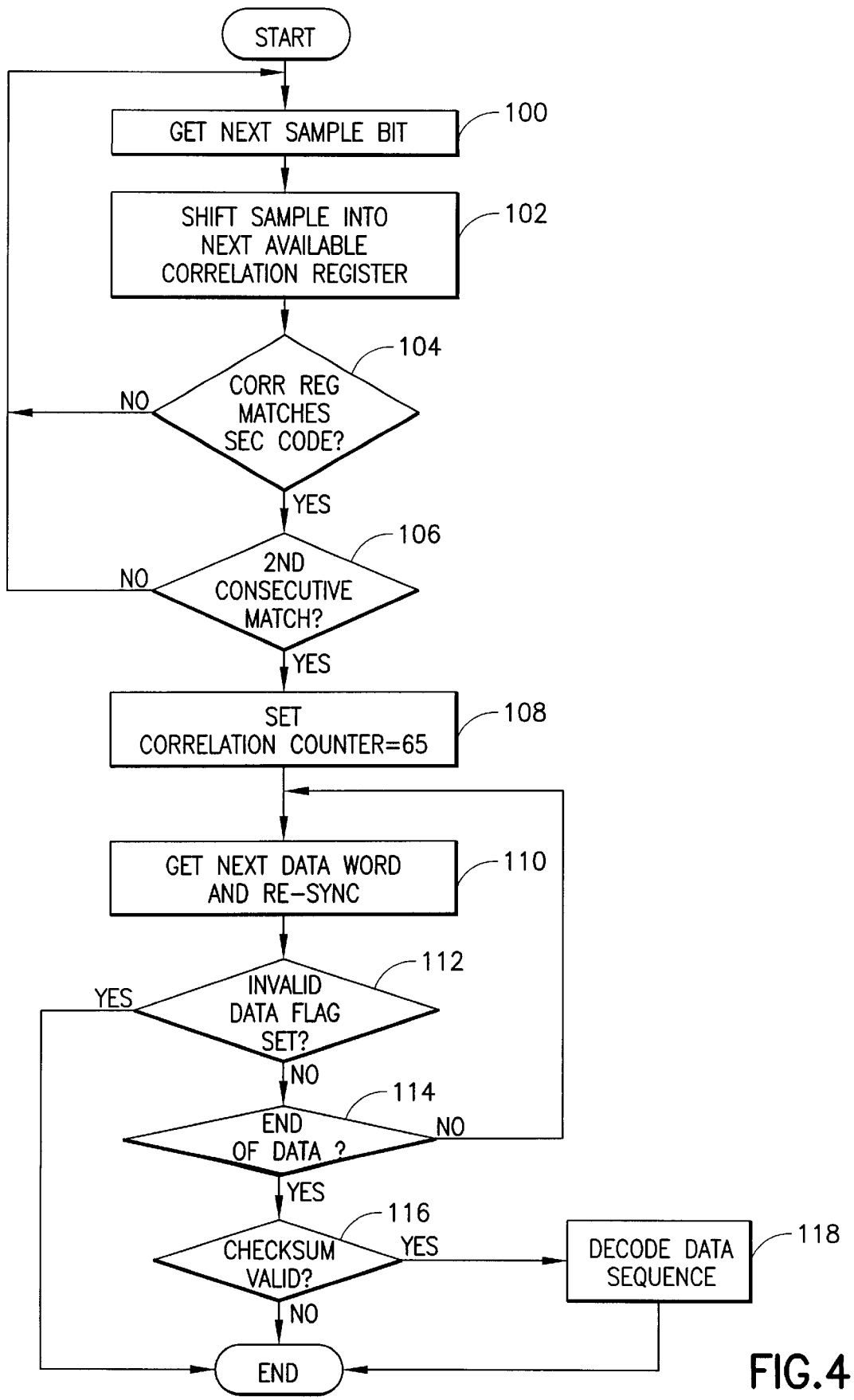

CORDLESS TELEPHONE AND METHOD OF SYNCHRONIZATION FOR SECURE, HIGH-SPEED, HIGH-VOLUME DATA TRANSFER

BACKGROUND INFORMATION

1. Field of the Invention

This invention relates to cordless telephones, and more particularly to a cordless telephone which employs synchronization of large burst data transmission.

2. Description of the Related Art

It is quite common in the cordless telephone field to send digital information in data bursts. In traditional cordless telephone models where speech data is sent via analog transmission means, short digital data bursts are typically employed to transmit basic telephone commands from the telephone handset to the telephone base unit and vice versa. In digital cordless telephones, however, both command data and speech data are sent via short digital data bursts.

In most cordless telephones, the length of each data burst is limited in duration. Additionally, each data burst requires a relatively substantial amount of "overhead" as compared to the amount of information data actually transferred. For example, the data burst described in U.S. Pat. No. 5,073,932 (Yossifor et al) is 24 bits in length (excluding the "synchronization code" which is simply an alternating pattern of "1" and "0" used to stabilize the receiver hardware). Of these 24 bits, only five bits are used for command data, and the remaining bits are overhead.

Short data burst length and high overhead are not problematic for first generation cordless telephones due to the limited number of commands that need to be transferred between the telephone base unit and the telephone handset. However, in order to accommodate the increasing variety of services being offered by local telephone companies (e.g., Caller ID, Call-Waiting Caller ID, Caller ID Deluxe, Type 3 Telephones, etc.), it has become necessary to transmit larger streams of data from the base unit to the handset. For example, a cordless telephone user might want the ability to access Caller ID information through the handset either audibly through a speaker or visually via a text display. Moreover, these data streams often need to be transferred very quickly. Simply cascading several short data bursts in sequence will often require too much time to convey the required information due to the high overhead.

Current methods for receiving data burst transmissions are incapable of receiving long data bursts (i.e. 25 bytes or more) and/or are relatively costly to implement. The primary reason for being incapable of receiving long data bursts regards the difficulties in maintaining proper data burst synchronization between the transmitter and receiver.

In the prior art, synchronization of the transmitter and receiver is typically established only at the beginning of a data burst. Since steps are not taken during the remainder of the burst to adjust the synchronization of the signal, minor discrepancies between the transmitter and receiver clocks quickly accumulate, leading to a loss of synchronization in the form of bit-slippage (gaining or losing at least 1 bit) at the receiver.

This occurs even with cordless telephones which transmit speech data digitally. U.S. Pat. No. 5,434,905 (Maeda et al) provides an example of a digital cordless telephone which uses data bursts for both speech and data transmission. Since the synchronization is established only at the beginning of the data burst, the only way to maintain synchronization for any significant amount of time is to use crystal oscillators with extremely low tolerances in both the base unit and handset. In practice, this is a much too costly solution given the competitive nature of today's telecommunications market.

U.S. Pat. No. 5,436,937 (Brown et al) discloses a rather complex, hardware intensive method of maintaining data burst synchronization. Brown's invention is implemented using a multi-mode phase-locked loop circuit combined with an early/late bit transition accumulator. Although the multi-mode phase-locked loop circuit provides a way of maintaining synchronization between the handset and base unit throughout a data burst, it is too costly for use in cordless telephones.

OBJECTS AND SUMMARY

It is therefore a general object of the present invention to provide an improved cordless telephone.

It is a further object of the present invention to provide a secure means for transmitting relatively large data bursts between the base unit and the handset of a cordless telephone.

It is a further object of the present invention to provide a technique for transmitting a relatively large data burst between the base unit and the handset of a cordless telephone at a relatively high transmission rate.

It is a further object of the present invention to accomplish the foregoing objects at low cost.

It is still a further object of the present invention to overcome inherent disadvantages of known cordless telephones.

In accordance with one form of the present invention, a cordless telephone unit includes a base unit having a data generator for generating a digital data burst having periodic transitions, a data encoder operatively coupled to the data generator for encoding the digital data burst to provide an encoded digital data burst, and a transmitter operatively coupled to the data encoder for transmitting the encoded data burst. The cordless telephone unit also includes a handset having a receiver responsive to the encoded data burst and sampling the encoded data burst, and a synchronization device operatively coupled to the receiver for maintaining synchronization between the receiver and the transmitted encoded data burst by comparing transition periods in the transmitted encoded data burst.

In accordance with another form of the present invention, a method of synchronization between a base unit and a handset of a cordless telephone system includes generating a digital data burst having periodic transitions in the base unit, encoding the digital data burst and transmitting the encoded data burst from the base unit to the handset. The method further includes transmitting the encoded data burst from the base unit to the handset, receiving the encoded data burst in the handset, sampling the received encoded data burst in the handset, and synchronizing sampling and transmission of the encoded data burst by comparing transition periods of the transmitted encoded data burst.

The present invention provides a very efficient technique of dynamically adjusting synchronization throughout a data burst without the extensive use of hardware. This technique allows for much longer streams of data to be transferred without requiring the presence of ultra-precise oscillators in the base unit and the handset.

An additional improvement of the present invention is that the method of synchronization uses information already present in the data stream; that is, no additional synchronization bits need to be sent in the longer burst. This greatly reduces overhead as the data burst length increases and allows for a relatively large amount of data to be transferred in a short period of time.

The above and other objects, features and advantages of the invention will become readily apparent from the following detailed description thereof which is to be read in connection with the accompanying drawings.

BRIEF DESCRIPTION OF THE DRAWINGS

FIG. 4 is a flow chart of a data burst analyzing process according to the present invention.

DETAILED DESCRIPTION OF THE PREFERRED EMBODIMENTS

Figure 1:
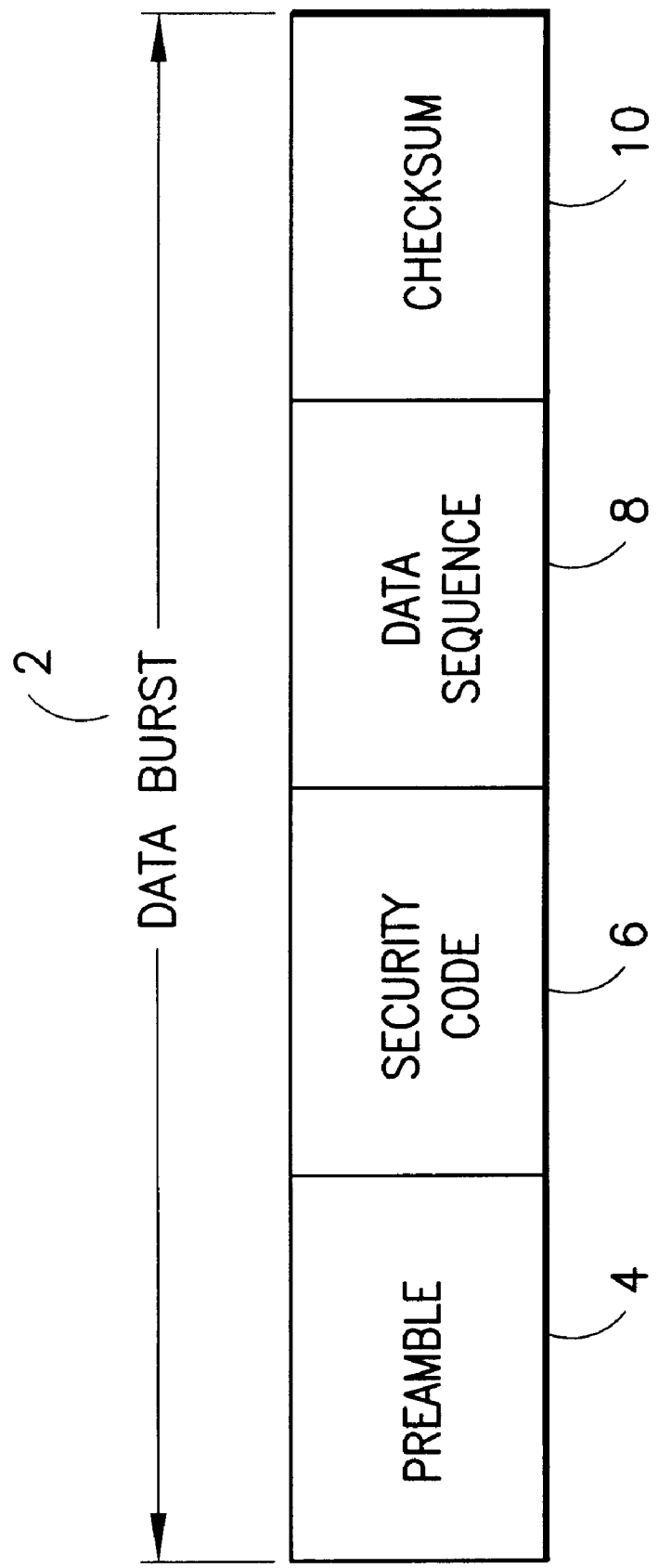
FIG. 1 is a schematic representation of a data burst according to the present invention.

Referring now to FIG. 1, a data burst 2 is shown. Data burst 2 includes a preamble portion 4, a security code portion 6, a data sequence portion 8, and a checksum portion 10. As used herein, a word refers to 16 binary bits and a byte refers to 8 binary bits.

In the preferred embodiment of the invention, the preamble portion 4 includes a series of bits alternating at regular intervals between logic level "0" and logic level "1". The preamble portion 4 preferably does not contain any data information to be transferred. The purpose of the preamble portion 4, which is generated by the data burst assembler 52 shown in FIG. 2), is simply to prepare hardware contained in a receiver portion of a telephone handset 18 for the remainder of the incoming data burst. For example, there is a tendency for decision comparator 22 to remain in its current logic state, this tendency increasing over time, and thereby increasing the probability that a differing incoming signal will go undetected.

Figure 2:
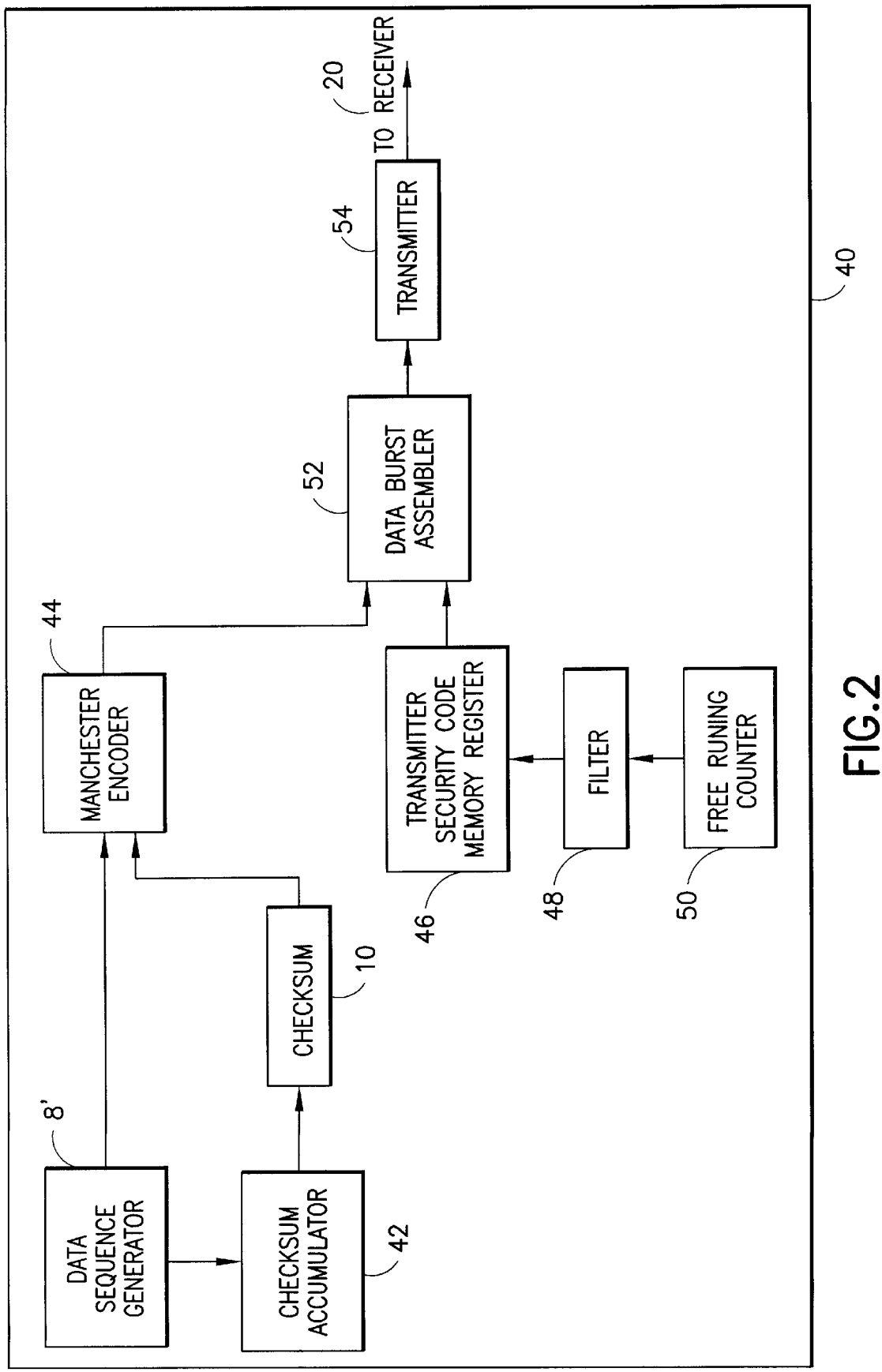
FIG. 2 is a block diagram showing the generation and transmission of a data burst within a cordless telephone base unit according to the present invention.
Figure 3:
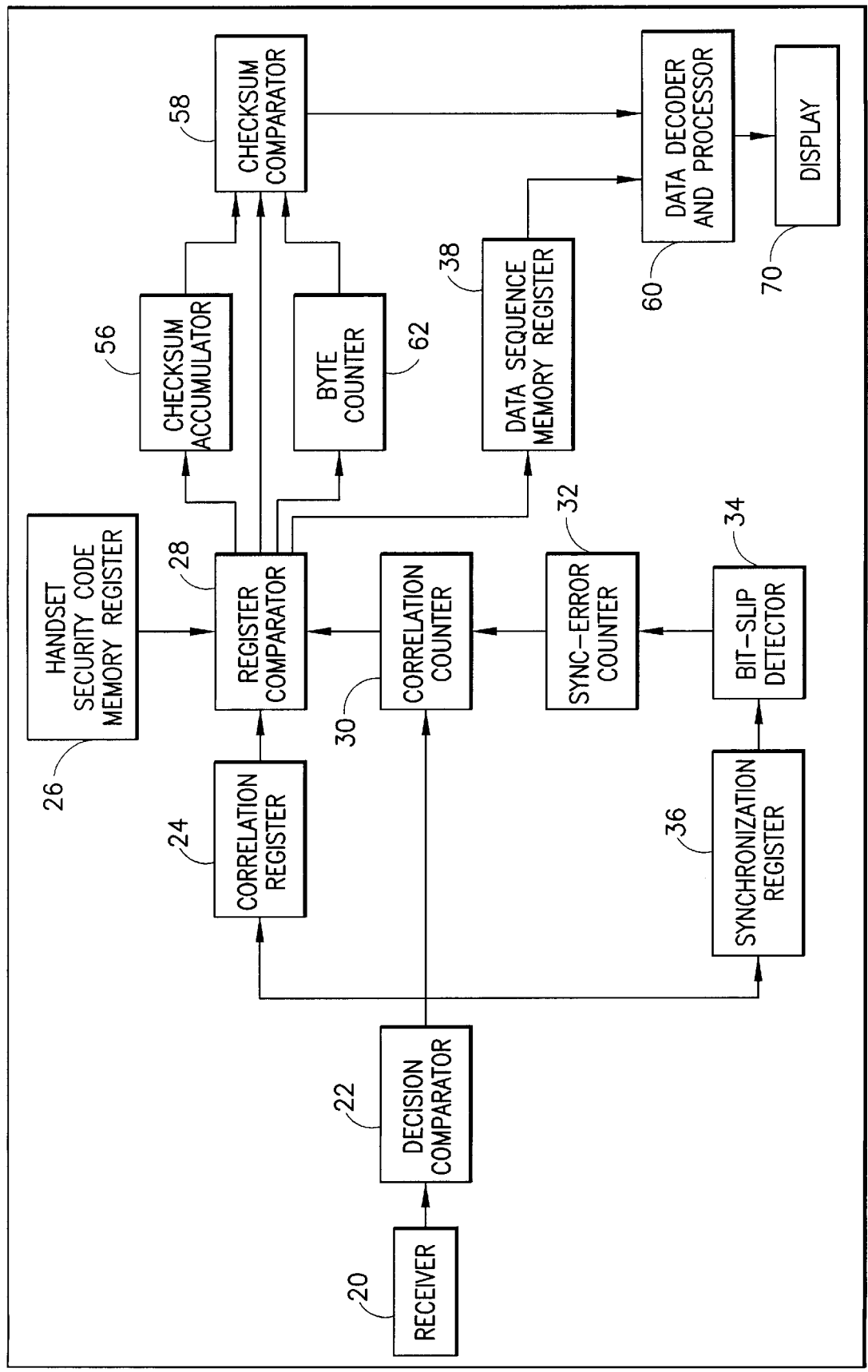
FIG. 3 is a block diagram showing the reception and analysis of a data burst within a cordless telephone handset according to the present invention.

Referring now to FIG. 2, the security code portion 6 of data burst 2 is preferably generated in telephone base unit 40 by a free running counter 50 (described below). As shown in FIG. 2, the free running counter 50 has its output signal provided to filter 48 which removes certain undesired sequences from the free running counter output signal (for example, a "1" following many "0" and vice-versa). Each time the telephone handset 18 (shown in FIG. 3) is placed in the cradle (not shown) of the base unit 40 (see FIG. 2), a new security code 6 is randomly generated by the free running counter 50 and provided to filter 48. The security code 6 is then provided to and stored in both the transmitter security code memory register 46 and the handset security code memory register 26. When the handset 18 is placed in the cradle of the base unit 40, the handset security code memory register 26 is operatively coupled to the transmitter security code memory register 46 to receive the randomly generated security code 6. In a preferred embodiment, the security code 6 is one word (16 bits) in length.

The data sequence portion 8 of data burst 2 is generated by data sequence generator 8' and is preferably encoded with a on-return to zero (NRZ) code by the base unit 40 before being transmitted by transmitter 54 to receiver 20 of the handset 18. In a preferred embodiment, the NRZ encoding of the data sequence portion 8 is provided by a Manchester encoder 44. NRZ encoding is a well known code form that has only two states commonly referred to as "zero" and "one". There is no neutral or rest condition in NRZ encoding. In other words, the Manchester encoder 44 replaces every logic level "0" bit with the two bits "01" and replaces every logic level "1" bit with the two bits "10". Therefore, for example, an eight bit sequence "1010 0011" which is encoded by the Manchester encoder 44 is transformed to the 16 bit sequence of "1001 1001 0101 1010". As known in the art, the spaces between each four bits of the 8 and 16 bit sequence have been added simply for visual clarity.

The checksum portion 10 of the data burst 2 is a byte representing the total "value" of the data sequence 8. In a preferred embodiment, the checksum 10 is generated by a checksum accumulator 42 located in base unit 40. The checksum accumulator 42 adds the binary values of all bytes in the data sequence 8 and provides a checksum accumulator output signal. The checksum accumulator output signal (corresponding to checksum 10) provides reference information to indicate whether all of the data sequence was accurately transmitted from the base unit 40 to the receiver 20 of handset 18. Specifically, as explained in more detail below, the checksum portion 10 of data burst 2 is compared against the value output by checksum accumulator 56 of handset 18 to determine if the transmission from the base unit 40 to the handset 18 is proper and complete. The checksum portion 10, in a preferred embodiment, is also NRZ encoded to 16 bits using the manchester encoder 44.

In the preferred embodiment as shown in FIG. 2, the Manchester encoded data sequence portion 8 and checksum portion 10 are provided, along with security code portion 6, to data burst assembler 52. Data burst assembler 52 receives the data sequence portion 8, checksum portion 10 and security code portion 6, assembles the portions, including the preamble portion 4, in series and provides the assembled data burst 2 to a transmitter 54 for transmission to receiver 20 of handset 18.

The receiver 20 preferably samples incoming data signals at four times the rate at which the data burst bits are transmitted by transmitter 54. The samples detected by receiver 20 are provided to a decision comparator 22. The decision comparator 22 determines the value (either logic "1" or logic "0") of each sample, and provides the detected value to correlation register 24, correlation counter 30 and synchronization register 36. By sampling each received signal several times, the decision comparator 22 is able to provide the correlation register 24 with redundant information which can be utilized at a later time to reduce the likelihood of a transmission/reception error.

The correlation register 24 preferably includes four shift registers (not shown) with the number of bit locations in each register being equal to the number of bits contained in security code 6. As samples (i.e., bits) are provided to correlation register 24 from decision comparator 22, the bits are provided to each shift register in turn so that the bit-zero locations of all four registers are filled before any one of the four shift registers receives a second sample. Thus, each shift register receives a bit value every fourth sample. Each sample taken by the receiver is provided to only one shift register.

When the handset 18 is not performing any other task, it is always placed in a security code detection mode. Each time a bit is provided to and stored in one of the shift registers of correlation register 24, a register comparator 28 compares the contents of the shift registers of correlation register 24 to the known security code 6 stored in handset security code memory register 26. If any two consecutive shift registers of the correlation register 24 match every bit of the security code 6 stored in handset security code memory register 26, it is determined that a valid security code 6 has been received from the base unit 40.

In a preferred embodiment, each shift register (hereinafter called COR1, COR2, COR3, COR4) of correlation register 24 has a 16 bit capacity, corresponding to a 16 bit security code 6. However, larger or smaller registers are foreseen. Suppose, for example, that the transmitter 54 provides a data burst 2 and the security code 6 is 0101 0010 1101 0011. Assuming perfect synchronization over an error-free channel, the decision comparator 22 will detect four identical samples of each bit of the security code 6. Thus, the first 20 samples to be detected (corresponding to the first five bits of the security code 6 stored in each of the shift registers of correlation register 24) would be 0000 1111 0000 1111 0000.

Assume that the first sample has just been detected (taken by receiver 20), and that the shift register presently available in the correlation register 24 is COR2. The first sample is provided to the first position of COR2 as follows:

| SHIFT | BIT# | | | | | | | | | | | | | | | |
|---|---|---|---|---|---|---|---|---|---|---|---|---|---|---|---|---|
| REG. | 15 | 14 | 13 | 12 | 11 | 10 | 9 | 8 | 7 | 6 | 5 | 4 | 3 | 2 | 1 | 0 |
| COR1 | X | X | X | X | X | X | X | X | X | X | X | X | X | X | X | X |
| COR2 → | X | X | X | X | X | X | X | X | X | X | X | X | X | X | X | 0 |
| COR3 | X | X | X | X | X | X | X | X | X | X | X | X | X | X | X | X |
| COR4 | X | X | X | X | X | X | X | X | X | X | X | X | X | X | X | X | wherein: "X" represents old data that was present before the current sample arrived; and "0" and "1" represent the bit values of the current sample.

The second sample will be placed in the first position of the next shift register (COR3) of the correlation register 24 as follows:

| SHIFT | BIT# | | | | | | | | | | | | | | | |
|---|---|---|---|---|---|---|---|---|---|---|---|---|---|---|---|---|
| REG. | 15 | 14 | 13 | 12 | 11 | 10 | 9 | 8 | 7 | 6 | 5 | 4 | 3 | 2 | 1 | 0 |
| COR1 | X | X | X | X | X | X | X | X | X | X | X | X | X | X | X | X |
| COR2 | X | X | X | X | X | X | X | X | X | X | X | X | X | X | X | 0 |
| COR3 → | X | X | X | X | X | X | X | X | X | X | X | X | X | X | X | 0 |
| COR4 | X | X | X | X | X | X | X | X | X | X | X | X | X | X | X | X |

After 61 security code samples are detected by receiver 20, the shift registers (COR1, COR2, COR3, COR4) of correlation register 24 will contain the following data:

| SHIFT | BIT# | | | | | | | | | | | | | | | |
|---|---|---|---|---|---|---|---|---|---|---|---|---|---|---|---|---|
| REG. | 15 | 14 | 13 | 12 | 11 | 10 | 9 | 8 | 7 | 6 | 5 | 4 | 3 | 2 | 1 | 0 |
| COR1 | X | 0 | 1 | 0 | 1 | 0 | 0 | 1 | 0 | 1 | 1 | 0 | 1 | 0 | 0 | 1 |
| COR2 | 0 | 1 | 0 | 1 | 0 | 0 | 1 | 0 | 1 | 1 | 0 | 1 | 0 | 0 | 1 | 1 |
| COR3 | X | 0 | 1 | 0 | 1 | 0 | 0 | 1 | 0 | 1 | 1 | 0 | 1 | 0 | 0 | 1 |
| COR4 | X | 0 | 1 | 0 | 1 | 0 | 0 | 1 | 0 | 1 | 1 | 0 | 1 | 0 | 0 | 1 |

At this point, register comparator 28 will determine that COR2 matches the current security code 6 stored in handset security code memory register 26. After the next sample is detected by receiver 20, register comparator 28 will determine that COR3 also matches the security code 6 as shown in the following:

| SHIFT | BIT# | | | | | | | | | | | | | | | |
|---|---|---|---|---|---|---|---|---|---|---|---|---|---|---|---|---|
| REG. | 15 | 14 | 13 | 12 | 11 | 10 | 9 | 8 | 7 | 6 | 5 | 4 | 3 | 2 | 1 | 0 |
| COR1 | X | 0 | 1 | 0 | 1 | 0 | 0 | 1 | 0 | 1 | 1 | 0 | 1 | 0 | 0 | 1 |
| COR2 | 0 | 1 | 0 | 1 | 0 | 0 | 1 | 0 | 1 | 1 | 0 | 1 | 0 | 0 | 1 | 1 |
| COR3 | 0 | 1 | 0 | 1 | 0 | 0 | 1 | 0 | 1 | 1 | 0 | 1 | 0 | 0 | 1 | 1 |
| COR4 | X | 0 | 1 | 0 | 1 | 0 | 0 | 1 | 0 | 1 | 1 | 0 | 1 | 0 | 0 | 1 |

Case 1

Thus, after 62 samples, two consecutive shift registers (i.e., COR2 and COR3) of the correlation register 24 match the security code 6 of data burst 2. Therefore, register comparator 28 determines that a valid security code 6 has been received from the base unit 40 and is present in the correlation registers 24.

It should be noted that, if there had been errors (i.e., "E") in the data detected by COR2 (for example, error at sample 9 and 11 of COR 2), then a valid security code would not have been detected until matches occurred in COR3 and COR4 (one sample later) as shown below (i.e., after 63 samples):

| SHIFT | BIT# | | | | | | | | | | | | | | | |
|---|---|---|---|---|---|---|---|---|---|---|---|---|---|---|---|---|
| REG. | 15 | 14 | 13 | 12 | 11 | 10 | 9 | 8 | 7 | 6 | 5 | 4 | 3 | 2 | 1 | 0 |
| COR1 | X | 0 | 1 | 0 | 1 | 0 | 0 | 1 | 0 | 1 | 1 | 0 | 1 | 0 | 0 | 1 |
| COR2 | 0 | 1 | 0 | 1 | E | 0 | E | 0 | 1 | 1 | 0 | 1 | 0 | 0 | 1 | 1 |
| COR3 | 0 | 1 | 0 | 1 | 0 | 0 | 1 | 0 | 1 | 1 | 0 | 1 | 0 | 0 | 1 | 1 |
| COR4 | 0 | 1 | 0 | 1 | 0 | 0 | 1 | 0 | 1 | 1 | 0 | 1 | 0 | 0 | 1 | 1 |
| | | | | | | Case 2 | | | | | | | | | | |

If there had been errors in the data stored in COR2 (samples 9 an 11) and COR3 (sample 6) as shown below, then valid security code detection would not have occurred until security code matches were found in COR4 and COR1 (one sample later) as shown below (after 64 samples):

| SHIFT | BIT# | | | | | | | | | | | | | | | |
|---|---|---|---|---|---|---|---|---|---|---|---|---|---|---|---|---|
| REG. | 15 | 14 | 13 | 12 | 11 | 10 | 9 | 8 | 7 | 6 | 5 | 4 | 3 | 2 | 1 | 0 |
| COR1 | 0 | 1 | 0 | 1 | 0 | 0 | 1 | 0 | 1 | 1 | 0 | 1 | 0 | 0 | 1 | 1 |
| COR2 | 0 | 1 | 0 | 1 | E | 0 | E | 0 | 1 | 1 | 0 | 1 | 0 | 0 | 1 | 1 |
| COR3 | 0 | 1 | 0 | 1 | 0 | 0 | 1 | 0 | 1 | E | 0 | 1 | 0 | 0 | 1 | 1 |
| COR4 | 0 | 1 | 0 | 1 | 0 | 0 | 1 | 0 | 1 | 1 | 0 | 1 | 0 | 0 | 1 | 1 |
| | | | | | | Case 3 | | | | | | | | | | |

If the register comparator 28 fails to detect a valid security code 6 from base unit 40, (e.g. an error is present in at least three of the four shift registers COR1, COR2, COR3 and COR4), the handset 18 requests that the base unit 40 retransmit the data burst 2. The receiver 20 can signal the transmitter 54 that an error has occurred by either sending a negative acknowledgement (NAK) signal or by not sending an acknowledgement (ACK) signal. Such signals are common and well known in the art and performed by conventional circuitry. As the transmitter 54 expects an acknowledgement from the receiver 20 at specified times, both NAK and the absence of ACK signals serve to notify the transmitter 54 that the data burst needs to be retransmitted.

The process of analyzing the security code 6 will then be restarted.

Once a valid security code 6 has been detected by register comparator 28, the handset 18 will enter a LOCK mode. In LOCK mode, the decision comparator 22 continues to provide (i.e., shift in) new data samples to correlation register 24. However, security code detection is no longer conducted. Instead, decision comparator 22 provides (i.e., shifts in) the data sequence portion 8 of the data burst 2 to the correlation register 24. The register comparator 28 analyzes the shift registers of the correlation register 24 to detect valid data words (i.e. data bytes which have been Manchester encoded into 16 bit data words).

In the incoming data stream of the encoded data burst 2, the first data word of the data sequence 8 immediately follows the security code 6. The correlation counter 30 counts the number of bits of the data burst 2 that arrive after a security code 6 has been detected. In this way, the correlation counter 30 can indicate when the correlation register 24 is completely filled and the first data word of the data sequence 8 should be present.

Since the sampling rate of the receiver 20 is four times faster than the transmission bit rate of transmitter 54, each bit. provided by transmitter 54 is preferably detected four times. Since each data word is equal in length to the length of the security code 6, there will be one sample time during which the correlation register 24 contains four copies of the first data word. This sample time occurs at the moment the last security code bit is shifted out of the correlation register 24.

In the preferred embodiment, if detection of a valid security code occurs as described in Case 1 above, then the correlation register 24 will contain four copies of the first data word exactly 66 sample times later. This is because there are 4×16=64 bits in the correlation register 24 at the moment the valid security code 6 is detected, plus an additional two security code bits not yet clocked in. Similarly, if detection of a valid security code occurs as described in Case 2 above, then the correlation register 24 will contain four copies of the first data word exactly 65 sample times later. Finally, if detection of a valid security code occurs as described in Case 3 above, the four copies of the first data word will be present exactly 64 sample times later.

In reality, the handset 18 does not know whether detection of a valid security code occurred under Case 1, Case 2, or Case 3. The obvious choice would be to initialize the correlation counter 30 to the average value required to clock in four copies of the first data word. In a preferred embodiment, the correlation counter 30 is initialized to 65 (the average of 66, 65, and 64). Clearly, if detection of a valid security code were to occur as described in Case 1 or Case 3, after receiving 65 samples, the correlation register 24 would not contain the data exactly as desired. However, assuming no other errors in transmission, the data will be skewed in only one of the shift registers of the correlation register 24 and the other three shift registers of the correlation register 24 will contain the desired data.

Immediately after the 65 samples are provided (i.e., clocked in), the register comparator 28 is used to determine if any two consecutive shift registers of the correlation register 24 contain the same data word. If two consecutive shift registers contain the same data word, then it is assumed with a rather high degree of reliability that this was indeed the data sent by the transmitter 54.

The technique described thus far works sufficiently well for transmitting one word of data at a time. However, for transmitting long bursts of data, minor timing discrepancies between the transmitter 54 and receiver 20 can cause "bit-slippage," resulting in an occasional gain or loss of a sample of data. In addition, transmission noise may cause erroneous bits to be stored in the correlation register 24, compounding the problem.

Suppose, for example, that the security code 6 has been detected as set forth above in connection with Case 1. The correlation counter 30 is preferably set at 65, and 65 samples are clocked in an attempt to fill the correlation register 24 with the first word of data. Since 65 is not the optimal value for Case 1, the first data word would appear in at most three of the four shift registers in the correlation register 24. Without synchronization, there would be no way to determine whether too many, too few, or the correct amount of bits have been shifted into the correlation register 24. In order to detect the second word, the only logical choice for the initial value of the correlation counter 30 is 64. However, without any means to make continual adjustments, as the length of the data sequence portion 8 is increased, the probability that the correlation register 24 would only contain three or even two copies of the correct word would quickly diminish with each new word received.

Therefore, in the preferred embodiment of the present invention, this problem can be solved by using a system which dynamically adjusts the correlation counter 30, and consequently the correlation register 24, by looking for "edges" in the received data. Specifically, as previously mentioned, as samples are shifted into the correlation register 24, they are concurrently shifted into synchronization register 36. The synchronization register 36 is a secondary shift register wherein the number of bit locations is preferably equal to half the number of bit locations in one of the shift registers (COR1, COR2, COR3, COR4) of the correlation register 24.

Recall that the data sequence 8 is Manchester encoded before being transmitted and therefore it will always be sent in bit-pairs of the form 01 or 10. After being sampled by the receiver 20 at four times the transmission bit-rate of transmitter 54, the bit-pairs will translate into bytes of the form 00001111 for bit-pair 01 or 11110000 for bit-pair 10. Provided that there are no errors, a single bit-pair will fill the entire synchronization register 36 in one of the preceding forms. A bit-slip detector 34 which is operatively coupled to synchronization register 36, compares the two center bits (i.e., bits 3 and 4, where bit 0 is located at the right most position) of the synchronization register 36. If the two center bits differ (i.e., a "0" and "1", or "1" and "0" are detected), the bit-slip detector 34 determines that the transmission and reception of the data stream is in "sync". If the center bits match (i.e., two "0" or two "1", are detected), it is determined that a bit-slip may have occurred. If bit-slippage is detected, the bit-slip detector 34 then performs a "one-sided majority vote test" on the contents of the synchronization register 36 to determine in which direction the slippage may have occurred.

The "one-sided majority vote test" is implemented as follows. Bits 2, 1, and 0 of the synchronization register 36 are evaluated and a "vote" is taken to obtain a predominant bit value (either 0 or 1). The predominant bit value is then compared to bit 3 of the synchronization register 36. If the predominant bit value matches the value of bit 3, it is determined that a shift to the left has occurred (i.e., too many bits have been shifted in) and the sync-error counter 32 is decremented by one. If the predominant value does not match the value of the third bit, then it is determined that the shift was to the right and the sync-error counter 32 is incremented by one. The term "lone-sided" is derived from the fact that only bits 2, 1, and 0 are used in the vote and bits 7, 6, and 5 are ignored. This significantly decreases the amount of time required for evaluation and therefore more data may be processed.

When a valid data word has been detected by the register comparator 28 in any two consecutive shift registers (COR1, COR2, COR3, COR4) of the correlation register 24, the detected valid data word is provided by register comparator 28 to a data sequence memory register 38 and stored therein. It is at this step of the process that the correlation counter 30 is reset to 63, 64, or 65, depending upon the value of the sync-error counter 32, according to a method such as the one to be described shortly. If a valid data word cannot be detected by the register comparator 28 in any two consecutive shift registers of the correlation register 24, it is determined that invalid data has been received. Thereafter, the handset 18 requests retransmission of the data burst 2. As the data sequence 8 is passed through the correlation register 24 and register comparator 28, a byte counter 62 which is electrically coupled to register comparator 28, counts the number of bytes in the transmitted data sequence 8. Substantially concurrently, handset checksum accumulator 56, which is also electrically coupled to register comparator 28, accumulates the binary values of the bytes. When the byte counter 62 reaches a predetermined value equal to the total number of bytes in the data sequence 8, checksum comparator 58 compares the value of the checksum accumulator 56 to the checksum 10 to verify that all of the data sequence 8 was transmitted. A data decoder and processor 60 decodes the data sequence 8 which has been stored in data sequence memory register 38 once the entire data sequence 8 has been received and verified by the checksum accumulator 56, byte counter 62 and checksum comparator 58. The processed data sequence 8 may be displayed on a text display 70, announced over a speaker, or otherwise output to the user.

Figure 5A:
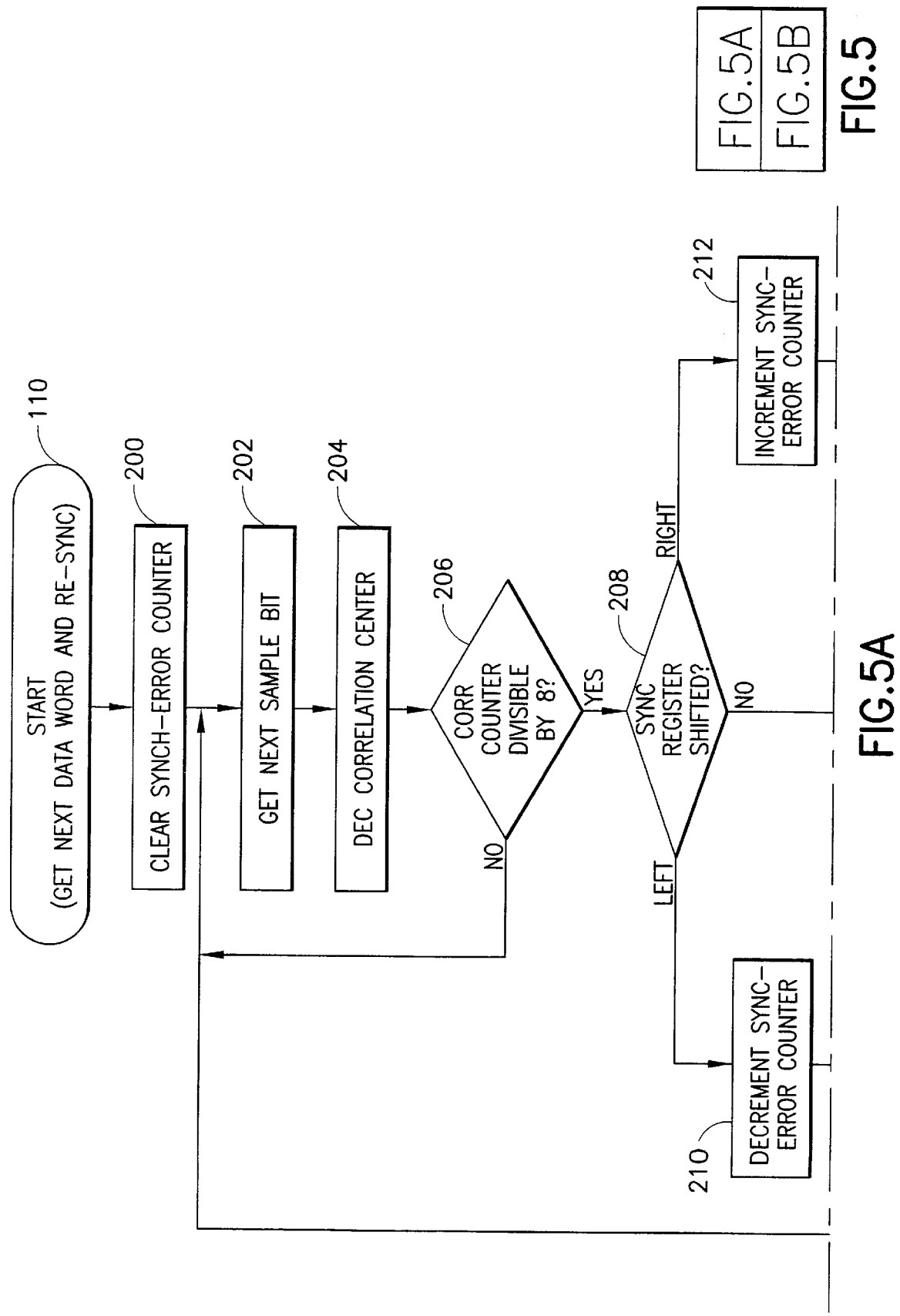
FIG. 5 is a flow chart of a synchronization process according to the present invention.
Figure 5B:
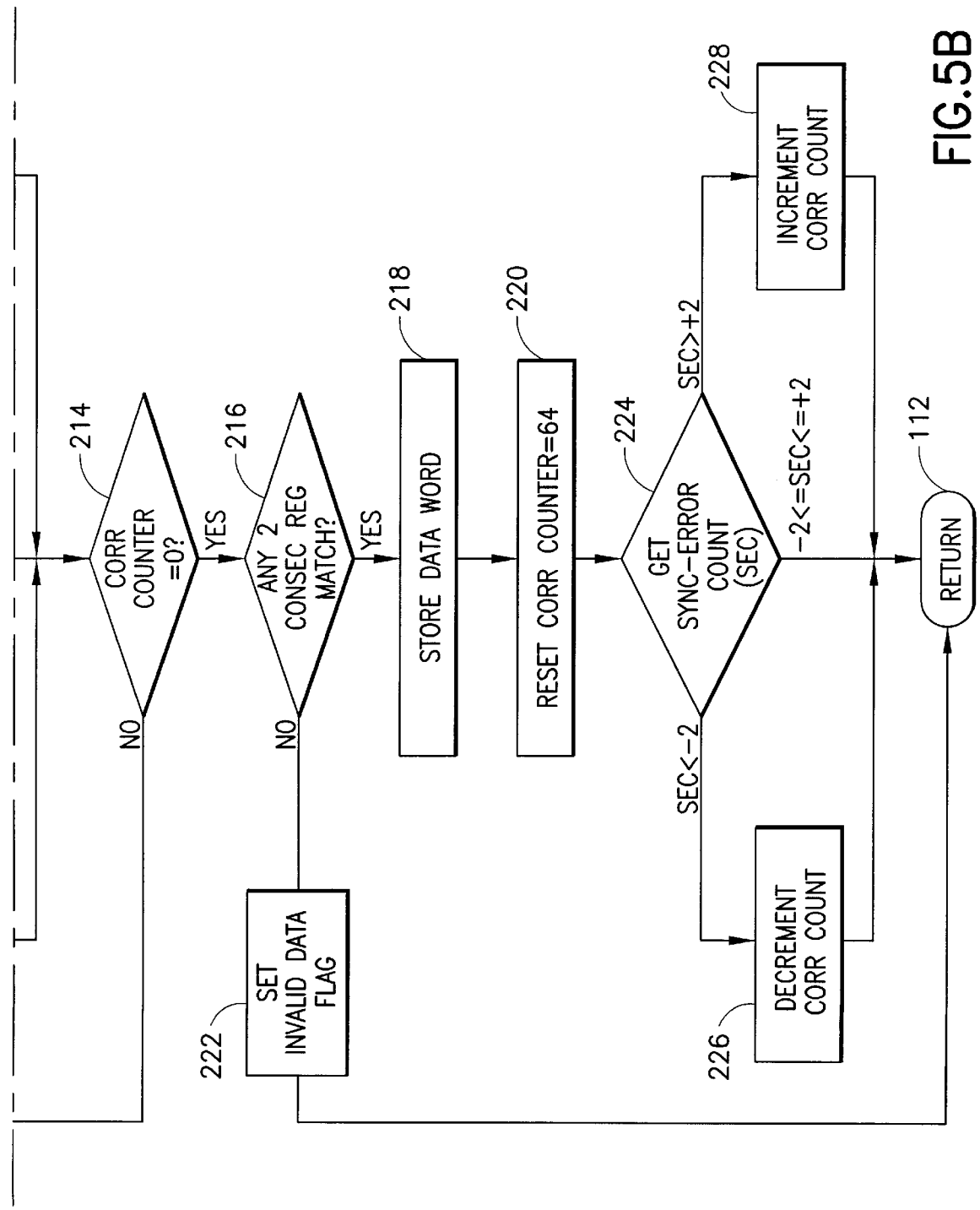

Referring now to FIGS. 4 and 5, the method of the preferred embodiment of the invention will be described.

Referring initially to FIG. 4, upon initialization of cordless telephone system (START), the handset 18 is placed in the security code detection mode. Initially, a sample bit of data is received (Step 100) and the sample bit is provided to one of the shift registers (COR1, COR2, COR3, COR4) of correlation register 24 (Step 102). Then, the contents of one of the shift registers of correlation register 24 is compared to the known security code 6 stored in the handset security code memory register 26 (Step 104). If the contents of one of the shift registers does not match the contents of the handset security code memory register 26 (NO in Step 104), the method returns to Step 100. If the contents of one of the shift registers matches the contents of the handset security code memory register (YES in Step 104), the method proceeds to Step 106. More specifically, a determination is made as to whether there is a second consecutive match (Step 106). If there is not a second consecutive match of the contents of the shift registers of correlation register 24 and handset security code memory register 26 (NO in Step 106), the method returns to Step 100. If there is the second consecutive match (YES in Step 106), this is indicative of detection of a valid security code and the method proceeds to Step 108. Thereafter, the correlation counter 30 is set to a value of 65 (Step 108). Then, a subroutine is initiated which corresponds to LOCK mode (Step 110), as shown in FIG. 5.

Referring now to FIG. 5, after the next data word is retrieved, the sync-error counter 32 is cleared (Step 200). Then, the next sample bit is shifted into the correlation register 24 as usual, but the same bit is also shifted into an 8 bit synchronization register 36 (Step 202). Thereafter, the correlation counter 30 is decremented by one (Step 204). Then, the correlation counter 30 is analyzed to determine if the new value is divisible by eight (Step 206). If the correlation counter 30 is not divisible by eight (NO in Step 206), the method returns to Step 202. If the correlation counter 30 is divisible by eight (YES in Step 206), then a determination is made as to whether a bit slip has occurred (Step 208), and if it did occur, whether the slip was to the right or to the left. If a slip occurred to the left (LEFT in Step 208), the sync-error counter 32 is decremented by one (Step 210). If a slip occurred to the right (RIGHT in Step 208), the sync-error counter 32 is incremented by one (Step 212). If a bit-slip has not occurred (NO in Step 208), the sync-error counter 32 is not changed. Next, the correlation counter 30 is analyzed to determine if it is equal to zero (Step 214). If the correlation counter is equivalent to zero (YES in Step 214), the method proceeds to Step 216. However, if correlation counter 30 is not equal to zero, (NO in Step 214), then the method returns to Step 202 wherein the next sample bit is received.

At step 216, the consecutive shift registers of the correlation register 24 are compared to determine if two consecutive shift registers having matching entries. If a match is not found (NO in Step 216), it is determined that errant or invalid data was transmitted, and an invalid data flag is set (Step 222). The subroutine terminates and returns to the main method at step 112. If two consecutive shift registers have matching entries (YES in Step 216), then the data word is stored in the data sequence memory register 38 (Step 218). Thereafter, the correlation counter 30 is reset to a value of 64 (Step 220).

Then, the value of the sync-error counter 32 (SEC) is analyzed to determine if a shift has occurred (Step 224). If SEC<−2, the correlation counter 30 is decremented by one (Step 226). If SEC>+2, the correlation counter 30 is incremented by one (Step 228). If −2≦SEC≦+2, the correlation counter 30 is unchanged. The subroutine then terminates and returns to the main method (Step 112).

Referring again to FIG. 4, a determination is made as to whether the invalid data flag has been set (Step 112). If the invalid data flag has been set (YES in Step 112), then the method ends. However, if the invalid data flag has not been set (NO in Step 112), a determination is made as to whether the current word is the last word of the data sequence 8 (Step 114). If the current word is not the last word of the data sequence (NO in Step 114), the method returns to Step 110. If the current word is the last word of the data sequence (YES in Step 114), the value of the handset checksum accumulator 56 is compared to the value of the checksum 10 (Step 116). If the values are equal (YES in Step 116), the data sequence 8 is decoded (Step 118). Step 118 decodes the data sequence 8 stored in the data sequence memory register 38 and proceeds to exit the method upon completion. If the values are not equal (NO in Step 116), the method terminates (END).

Although the invention has been illustrated and described in detail in the drawings and foregoing description, the same is to be considered as illustrative and not restrictive in character, it being understood that only preferred embodiments have been shown and described, and that all changes and modifications that come within the spirit and scope of the invention, as defined in the claims, are to be protected.

What is claimed is:

1. A cordless telephone unit comprising:
   a base unit comprising:
   a data generator for generating a digital data burst having periodic transitions;
   a data encoder operatively coupled to said data generator, said data encoder encoding the digital data burst to provide an encoded digital data burst; and
   a transmitter operatively coupled to said data encoder for transmitting the encoded digital data burst; and
   a handset comprising:
   a receiver responsive to the encoded digital data burst for receiving and sampling the encoded digital data burst, wherein the encoded digital data burst is oversampled; and
   a synchronization device operatively coupled to said receiver for maintaining synchronization between the received and the transmitted encoded digital data bursts without adjusting clock frequencies by comparing periodic transitions in the oversampled transmitted encoded digital data burst.

2. The cordless telephone unit as defined by claim 1, wherein said synchronization device maintains synchronization between the received and the transmitted encoded digital data burst in accordance with a characteristic of said data encoder.

3. The cordless telephone unit as defined by claim 1, wherein said data encoder encodes the digital data burst with a nonreturn to zero code.

4. The cordless telephone unit as defined by claim 1, wherein said data encoder comprises a Manchester encoder.

5. The cordless telephone unit as defined by claim 1, wherein the encoding provided by said data encoder includes an expected time of transition of an incoming signal.

6. The cordless telephone unit as defined by claim 1, wherein said synchronization device maintains said synchronization between the received and the transmitted encoded digital data burst by comparing an actual time of transition of the oversampled transmitted encoded data burst to an expected time of transition of the oversampled transmitted encoded data burst and based on the comparison, adjusting a sampling point of said oversampled transmitted encoded data burst.

7. The cordless telephone unit as defined by claim 6, wherein said synchronization device determines adjustment of the sampling point by a majority vote of samples around the sampling point.

8. The cordless telephone unit as defined by to claim 7, wherein said majority vote is a one-sided vote.

9. The cordless telephone unit as defined by claim 2, wherein said characteristic of said data encoder includes an expected time of transition of an incoming signal.

10. The cordless telephone unit as defined by claim 9, wherein said synchronization device maintains said synchronization between the received and the transmitted encoded digital data burst by comparing an actual time of transition of the oversampled transmitted encoded data burst to an expected time of transition of the oversampled transmitted encoded data burst and, based on the comparison, adjusting a sampling point of said oversampled transmitted encoded digital data burst.

11. The cordless telephone unit as defined by claim 10, wherein said synchronization device determines adjustment of the sampling point by a majority vote of samples around the sampling point.

12. The cordless telephone unit as defined by claim 11, wherein said majority vote is a one-sided vote.

13. The cordless telephone unit as defined by claim 1, wherein said handset further comprises a text display.

14. The cordless telephone unit as defined by claim 13, wherein said text display of said handset displays caller identification information.

15. The cordless telephone unit as defined by claim 1, wherein the digitally encoded data burst includes caller identification information.

16. The cordless telephone unit as defined by claim 1, wherein the synchronization device comprises:

a synchronization register for receiving the oversampled transmitted encoded data burst; and a bit-slip detector for comparing two bits of the oversampled transmitted encoded data burst and determining if a bit slip has occurred and a direction of the bit slip.

17. The cordless telephone unit as defined by claim 16, further comprising:

a sync-error counter for one of decrementing and incrementing a count therein in dependence on whether a bit slip has been detected by said bit-slip detector and the direction of said bit slip.

18. The cordless telephone unit as defined by claim 17, further comprising:

a correlation counter for recording the number of bits that arrive after a security code in the received encoded data burst has been detected, said correlation counter being one of decremented and incremented in response to said sync-error counter and providing an indication as to a location of a first data word in said transmitted encoded data burst.

19. A method of synchronization between a base unit and a handset of a cordless telephone system, said method comprising the steps of:

a) generating a digital data burst having periodic transitions in said base unit;

b) encoding said digital data burst in said base unit;

c) transmitting said encoded digital data burst from said base unit to said handset;

d) receiving said encoded digital data burst in said handset;

e) oversampling said transmitted encoded digital data burst in said handset; and f) synchronizing said received and transmitted encoded digital data bursts without adjusting clock frequencies by comparing the periodic transitions in the oversampled transmitted encoded data burst.

20. The method of synchronization as defined by claim 19, wherein said step of synchronizing is performed in accordance with a characteristic of a data encoder which encodes said digital data burst.

21. The method of synchronization as defined by claim 20, wherein said step of encoding includes the step of encoding said digital data burst with a nonreturn to zero code.

22. The method of synchronization as defined by claim 21, wherein said nonreturn to zero code encoding comprises Manchester encoder.

23. The method of synchronization as defined by claim 20, wherein said step of encoding includes an expected time of transition of an incoming signal.

24. The method of synchronization as defined by claim 23, wherein said step of synchronizing includes the steps of:

comparing an actual time of transition to said expected time of transition; and adjusting a sampling point of said oversampled transmitted encoded data burst.

25. The method of synchronization as defined by claim 24, wherein said step of adjusting determines adjustment of the sampling point by a majority vote of samples around said sampling point.

26. The method of synchronization as defined by claim 23, wherein said majority vote is a one-sided vote.

27. The method of synchronization as defined by claim 20, wherein said step of encoding includes an expected time of transition of an incoming signal.

28. The method of synchronization as defined by claim 27, wherein said step of synchronizing includes the steps of:

comparing an actual time of transition to said expected time of transition; and adjusting a sampling point of said oversampled transmitted encoded data burst.

29. The method of synchronization as defined by claim 28, wherein said step of adjusting determines adjustment of the sampling point by a majority vote of samples around said sampling point.

30. The method of synchronization as defined by claim 29, wherein said majority vote is a one-sided vote.

31. The method of synchronization as defined by claim 19, further comprising the step of displaying text.

32. The method of synchronization as defined by claim 31, wherein said encoded data burst includes caller identification information.

33. The method of synchronization as defined by claim 32, wherein said step of displaying includes the step of displaying said caller identification information.

34. The method of synchronization as defined by claim 19, wherein the step of synchronizing includes the steps of:

receiving the oversampled transmitted encoded digital data burst in a synchronization register; and comparing two bits stored in the synchronization register to determine if a bit slip has occurred and a direction of said bit slip.

35. The method of synchronization as defined by claim 34, further comprising the step of one of decrementing and incrementing a count in a sync-error counter in dependence on whether a bit slip has been determined and on the direction of said bit slip.

36. A method of synchronization as defined by claim 35, further comprising the steps of:

maintaining in a correlation counter having a count, the number of bits that arrive after a security code in the received encoded digital data burst has been detected;

one of decrementing and incrementing the count in the correlation counter in response to said sync-error counter; and providing an indication of when a first data word should be present based on the count in said correlation counter.

37. A cordless telephone unit comprising:

a base unit comprising:

a data generator for generating a digital data burst having periodic transitions;

a data encoder operatively coupled to said data generator, said data encoder encoding the digital data burst to provide an encoded digital data burst; and a transmitter operatively coupled to said data encoder for transmitting the encoded digital data burst; and a handset comprising:

a receiver responsive to the encoded digital data burst for receiving and sampling the encoded digital data burst; and a synchronization device operatively coupled to said receiver for maintaining synchronization between the received and the transmitted encoded digital data bursts by comparing transition periods in the transmitted encoded digital data burst, wherein said synchronization device maintains synchronization between the received and the transmitted encoded digital data burst by comparing an actual time of transition of the encoded data burst to an expected time of transition of the encoded data burst and based on the comparison, adjusting a sampling point of said transmitted encoded data burst, and wherein said synchronization device determines adjustment of the sampling point by a majority vote of samples around the sampling point.

38. The cordless telephone unit as defined by to claim 37, wherein said majority vote is a one-sided vote.

39. A cordless telephone unit comprising:
a base unit comprising:
a data generator for generating a digital data burst having periodic transitions;
a data encoder operatively coupled to said data generator, said data encoder encoding the digital data burst to provide an encoded digital data burst; and
a transmitter operatively coupled to said data encoder for transmitting the encoded digital data burst; and
a handset comprising:
a receiver responsive to the encoded digital data burst for receiving and sampling the encoded digital data burst; and
a synchronization device operatively coupled to said receiver for maintaining synchronization between the received and the transmitted encoded digital data bursts by comparing transitions periods in the transmitted encoded digital data burst,
wherein said synchronization device maintains synchronization between the received and the transmitted encoded digital data burst in accordance with a characteristic of said data encoder,
wherein said characteristic of said data encoder includes an expected time of transition of an incoming signal,
wherein said synchronization device maintains said synchronization between the received and the transmitted encoded digital data burst by comparing an actual time of transition of the oversampled transmitted encoded data burst to an expected time of transition of the encoded data burst and, based on the comparison, adjusting a sampling point of said transmitted encoded digital data burst, and
wherein said synchronization device determines adjustment of the sampling point by a majority vote of samples around the sampling point.

40. The cordless telephone unit as defined by claim 39, wherein said majority vote is a one-sided vote.

41. A cordless telephone unit comprising:
a base unit comprising:
a data generator for generating a digital data burst having p eriodic transitions;
a data encoder operatively coupled to said data generator, said data encoder encoding the digital data burst to provide an encoded digital data burst; and
a transmitter operatively coupled to said data encoder for transmitting the encoded digital data burst; and
a handset comprising:
a receiver responsive to the encoded digital data burst for receiving and sampling the encoded digital data burst; and
a synchronization device operatively coupled to said receiver for maintaining synchronization between the received and the transmitted encoded digital data bursts by comparing transition periods in the transmitted encoded digital data burst,
wherein the synchronization device comprises:
a synchronization register for receiving the sampled encoded data burst; and
a bit-slip detector for comparing two bits of the sampled encoded data burst and determining if a bit slip has occurred and a direction of the bit slip.

42. The cordless telephone unit as defined by claim 41, further comprising:
a sync-error counter for one of decrementing and incrementing a count therein in dependence on whether a bit slip has been detected by said bit-slip detector and the direction of said bit slip.

43. The cordless telephone unit as defined by claim 42, further comprising:
a correlation counter for recording the number of bits that arrive after a security code in the received encoded data burst has been detected, said correlation counter being one of decremented and incremented in response to said sync-error counter and providing an indication as to a location of a first data word in said transmitted encoded data burst.

44. A method of synchronization between a base unit and a handset of a cordless telephone system, said method comprising the steps of:
a) generating a digital data burst having periodic transitions in said base unit;
b) encoding said digital data burst in said base unit;
c) transmitting said encoded digital data burst from said base unit to said handset;
d) receiving said encoded digital data burst in said handset;
e) sampling said received encoded digital data burst in said handset; and
f) synchronizing said received and transmitted encoded digital data bursts by comparing periodic transitions in said transmitted encoded data burst,
wherein said step of synchronizing is performed in accordance with a characteristic of a data encoder which encodes said digital data burst,
wherein said step of encoding includes an expected time of transition of an incoming signal,
wherein said step of synchronizing comprises the steps of:
comparing an actual time of transition to said expected time of transition; and
adjusting a sampling point of said transmitted encoded data burst, and
wherein said step of adjusting determines adjustment of the sampling point by a majority vote of samples around said sampling point.

45. A method of synchronization between a base unit and a handset of a cordless telephone system, said method comprising the steps of:
a) generating a digital data burst having periodic transitions in said base unit;
b) encoding said digital data burst in said base unit;
c) transmitting said encoded digital data burst from said base unit to said handset;
d) receiving said encoded digital data burst in said handset;
e) sampling said received encoded digital data burst in said handset; and
f) synchronizing said received and transmitted encoded digital data bursts by comparing periodic transitions in said transmitted encoded data burst,
wherein said step of synchronizing is performed in accordance with a characteristic of a data encoder which encodes said digital data burst,
wherein said step of encoding includes an expected time of transition of an incoming signal, and
wherein said majority vote is a one-sided vote.

46. A method of synchronization between a base unit and a handset of a cordless telephone system, said method comprising the steps of:
   a) generating a digital data burst having periodic transitions in said base unit;
   b) encoding said digital data burst in said base unit;
   c) transmitting said encoded digital data burst from said base unit to said handset;
   d) receiving said encoded digital data burst in said handset;
   e) sampling said received encoded digital data burst in said handset; and
   f) synchronizing said received and transmitted encoded digital data bursts by comparing periodic transitions in said transmitted encoded data burst,
      wherein said step of synchronizing is performed in accordance with a characteristic of a data encoder which encodes said digital data burst,
      wherein said step of encoding includes an expected time of transition of an incoming signal,
      wherein said step of synchronizing includes the steps of:
         comparing an actual time of transition to said expected time of transition; and
         adjusting a sampling point of said transmitted encoded data burst, and
      wherein said step of adjusting determines adjustment of the sampling point by a majority vote of samples around said sampling point.

47. The method of synchronization as defined by claim 46, wherein said majority vote is a one-sided vote.

48. A method of synchronization between a base unit and a handset of a cordless telephone system, said method comprising the steps of:
   a) generating a digital data burst having periodic transitions in said base unit;
   b) encoding said digital data burst in said base unit;
   c) transmitting said encoded digital data burst from said base unit to said handset;
   d) receiving said encoded digital data burst in said handset;
   e) sampling said received encoded digital data burst in said handset; and
   f) synchronizing said received and transmitted encoded digital data burst by comparing periodic transitions in said transmitted encoded data burst,
      wherein the step of synchronizing comprises the steps of:
         receiving the sampled encoded digital data burst in a synchronization register; and
         comparing two bits stored in the synchronization register to determine if a bit slip has occurred and a direction of said bit slip.

49. The method of synchronization as defined by claim 48, further comprising the step of one of decrementing and incrementing a count in a sync-error counter in dependence on whether a bit slip has been determined and on the direction of said bit slip.

50. A method of synchronization as defined by claim 49, further comprising the steps of:
   maintaining in a correlation counter having a count, the number of bits that arrive after a security code in the received encoded digital data burst has been detected;
   one of decrementing and incrementing the count in the correlation counter in response to said sync-error counter; and
   providing an indication of when a first data word should be present based on the count in said correlation counter.

* * * * *